UNITED STATES PATENT OFFICE.

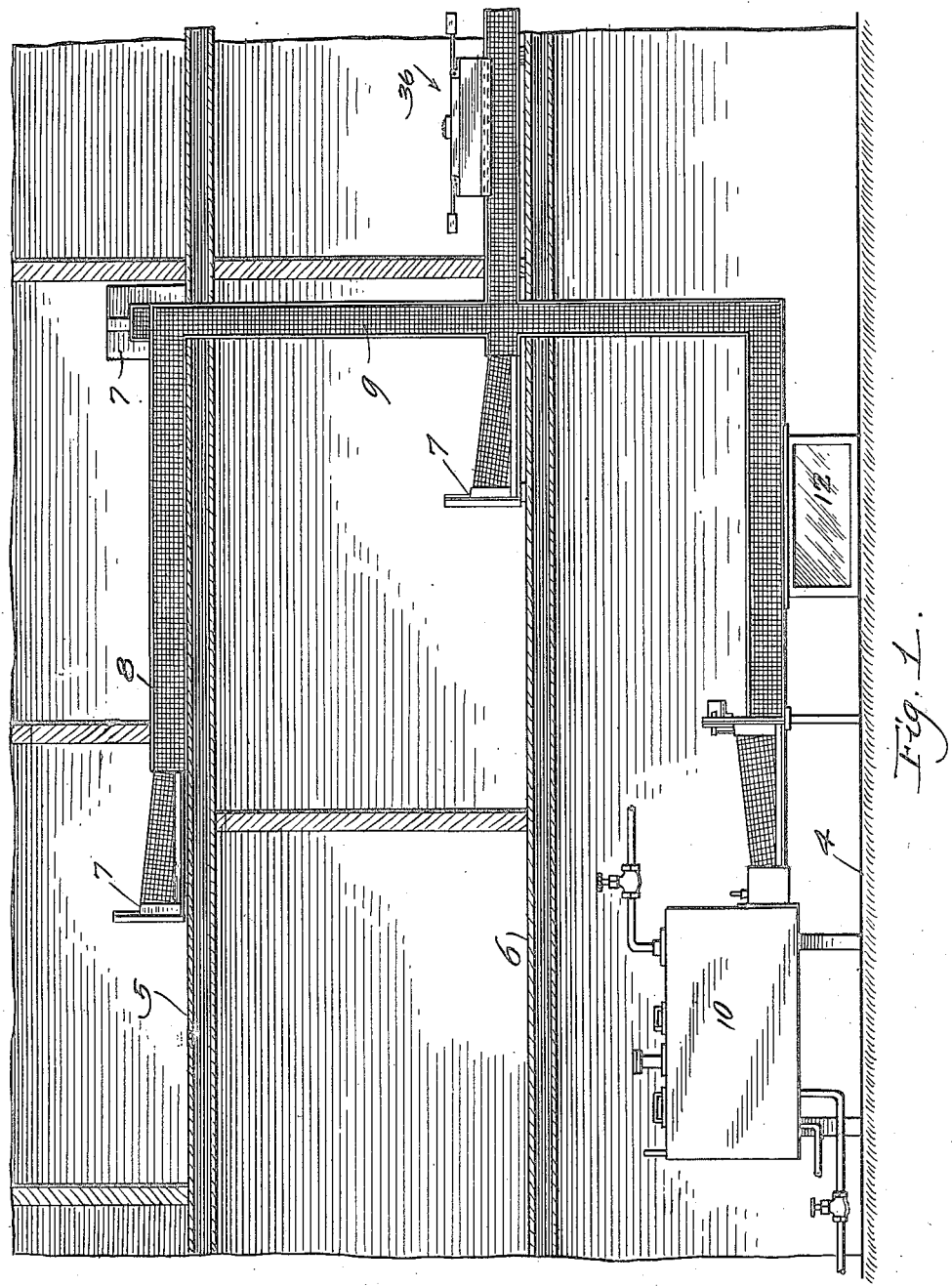

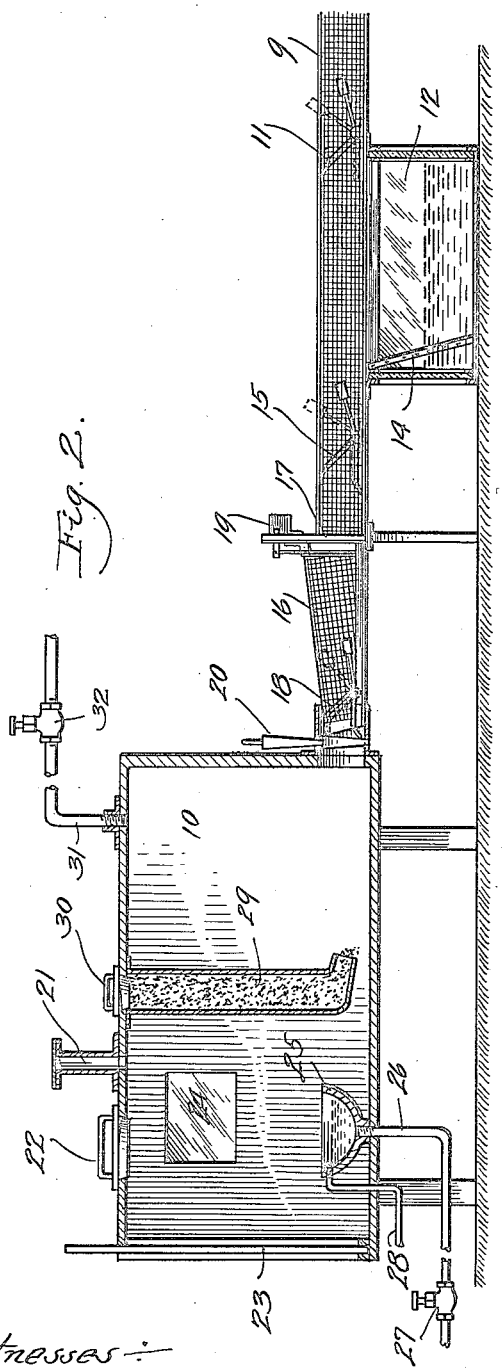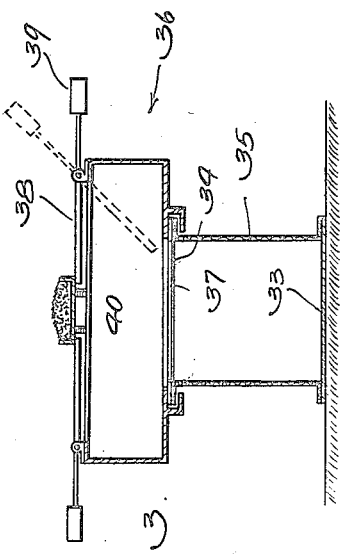

DAVID L. LEVEY, OF LOS ANGELES, CALIFORNIA.

RODENT-EXTERMINATING SYSTEM.

1,137,639.  Specification of Letters Patent.  Patented Apr. 27, 1915.

Application filed November 3, 1913. Serial No. 798,846.

*To all whom it may concern:*

Be it known that I, DAVID L. LEVEY, a citizen of the United States, residing at Los Angeles, in the county of Los Angeles and State of California, have invented new and useful Improvements in Rodent-Exterminating Systems, of which the following is a specification.

This invention relates to rodent exterminating systems, and the principal object is to provide a system having entrances disposed in a plurality of rooms or locations in a building having conduits leading therefrom to an exterminating station.

It is a further object to provide a rodent exterminating system with a plurality of automatic receiving entrances connected by open-work conduits to an exterminating station, together with means for fumigating and asphyxiating the rodents.

In the drawings accompanying this specification and forming therewith the application for Letters Patent: Figure 1 is a general sectional elevation of a building showing a plurality of floors with the conduits thereon and leading therefrom to an exterminating station. Fig. 2 is a detail sectional elevation of the exterminating station. Fig. 3 is a detail of a modified form of entrance to the conduits or runway.

More specifically in the drawings, 5 designates an upper floor, 6 an intermediate floor and 4 the floor of a basement or cellar, the two upper floors being shown as being divided by partitions into a plurality of rooms in each of which is located an entrance 7 preferably of the form illustrated and described in the application filed coincidently herewith, in which an automatic gate controls the entrance and a second door completely closes the exit so that exit can not be made from the conduit 8 connected therewith except through this runway or conduit to the vertically disposed main line 9 which communicates with the exterminating chamber 10.

Before reaching the exterminating chamber a pivoted door 11 is interposed in the main line 9 which is horizontally disposed at this point, and upon passing this door operated by the weight of the rodent the animal is precipitated into a tank 12 preferably supplied with glass walls in which an antiseptic solution is contained to show that the animal receives a suitable bath before making exit therefrom by a ladder 14 past the second pivoted door 15 to again enter a chamber of similar configuration to that previously described similar to the entrance trap 7 having an entrance way 17 and an exit door 18, this trap being also provided with a registering device 19 connected to the door 18, as described in the specification mentioned previously.

The extermination chamber 10 is provided with an entrance to which the trap 17 opens, this entrance being adapted to be closed airtight by means of a gate valve 20 so that the tank 10 can be sealed by this gate 20 as well as the other openings, that at 21 providing a ventilating flue and the cover 22 forming a closure for the hand hole through which the various operations desired may be performed without opening the end door 23 which affords complete access to the chamber.

A window 24 provides means for observing the number of animals and the condition of the animals entrapped, water being supplied to the watering basin 25 by means of a pipe 26 controlled by a valve 27. An overflow 28 is provided so that there is no danger of flooding. A hopper 29 adapted to contain food admitted through the opening covered by the cover 30 is provided, the lower end being constricted to an orifice too small to permit of the escape of the rodents but sufficiently large to allow the flow of food contained therein.

To provide for the extermination of the animals the pipe 31 is connected to a suitable supply of gas or poisonous vapor generated exteriorly of the system, this exterminating medium being controlled by means of the valve 32.

To assist in different locations along the conduit or runway, which is preferably formed of the solid top and bottom plates 34 and 33 respectively having the screen work side walls 35, an auxiliary trap 36 is adapted to be mounted over the apertured portion 37 in the upper plate 34 of the runway, the top of this trap being provided with pivoted floor sections 38 having balance weights 39, the plate being disposed in a trough 40 so that rodents jumping upon the plate 38 will capsize the latter and be precipitated within the runway located thereunder.

This system is particularly adapted to factories, club houses and vessels, in which it has been almost impossible to eliminate rodents of the character infesting this type of structure.

What I claim is:

1. In a rodent exterminating system, a conduit, entrance traps opening to the conduit, an exterminating station to which the conduit leads, and a tank adapted to contain a bath opening to said conduit, and arranged between the entrance traps and the exterminating station.

2. A rodent exterminating system, comprising a conduit, a plurality of entrance traps opening thereto, an exterminating station into which the conduit leads, a tank adapted to contain a bath arranged in the conduit between the entrance traps and the exterminating station, means for precipitating the rodents into the tank, and means for permitting the rodents to escape from the tank into the conduit and exterminating station.

3. In a rodent exterminating system in combination with a building or other inclosed structure, of a plurality of entrance devices communicatingly connected with a plurality of conduits, a central conduit connecting said branch conduits and leading to an exterminating station, a tank adapted to contain a bath, a registering device, and means to exterminate the rodents entrapped therein forming said exterminating station.

In witness that I claim the foregoing I have hereunto subscribed my name this 27th day of October, 1913.

DAVID L. LEVEY.

Witnesses:
 IRIE WELCH,
 MARIE BATTEY.